United States Patent [19]

Hamilton et al.

[11] 3,783,477

[45] Jan. 8, 1974

[54] SNAP FASTENER

[76] Inventors: Ross Lynton Hamilton, 12 Bhenheim Ave., Glen Waverly; Wilfred Laurence Hallam, 4 Garden Rd., Burwood, both of Australia

[22] Filed: Sept. 8, 1971

[21] Appl. No.: 178,568

[30] Foreign Application Priority Data
Oct. 7, 1970 Australia..................2781/70

[52] U.S. Cl................ 24/213 CS, 24/214, 24/220, 24/144, 85/36, 85/82
[51] Int. Cl.................................. A44b 17/00
[58] Field of Search............ 24/208 A, 213 R, 24/213 CS, 214, 216, 217, 219, 220, 107

[56] References Cited
UNITED STATES PATENTS

| | | | |
|---|---|---|---|
| 662,844 | 11/1900 | Weidmuller | 24/214 |
| 2,640,243 | 6/1953 | Jones | 24/219 |
| 2,933,793 | 4/1960 | Steinberg | 24/216 |
| 3,107,408 | 10/1963 | Huelster | 24/208 A |
| 3,156,962 | 11/1964 | Henson | 24/217 |
| 3,195,201 | 7/1965 | Ash | 24/208 A |
| 3,210,820 | 10/1965 | Humiston | 24/214 |
| 3,551,963 | 1/1971 | Mosher | 24/216 |

FOREIGN PATENTS OR APPLICATIONS

| | | | |
|---|---|---|---|
| 121,473 | 6/1946 | Australia | 24/213 |
| 1,114,883 | 4/1956 | France | 24/217 |
| 1,158,170 | 6/1958 | France | 24/208 A |

*Primary Examiner*—Bernard A. Gelak
*Attorney*—Richard Wiener

[57] ABSTRACT

The invention comprises a single or two piece snap fastener comprising a head and depending shank arranged to snap engage with a second part. A washer having a bore slightly less than the diameter of the shank is mounted on the shank. The washer has the inner-edge portion thereof directed away from the head so that the edge bites into the shank and firmly resists forces tending to move the washer along the shank away from the head.

The fastener is fixed onto clothing, fabric or other material by clamping the material between the washer and the head of the fastener.

6 Claims, 9 Drawing Figures

PATENTED JAN 8 1974 3,783,477
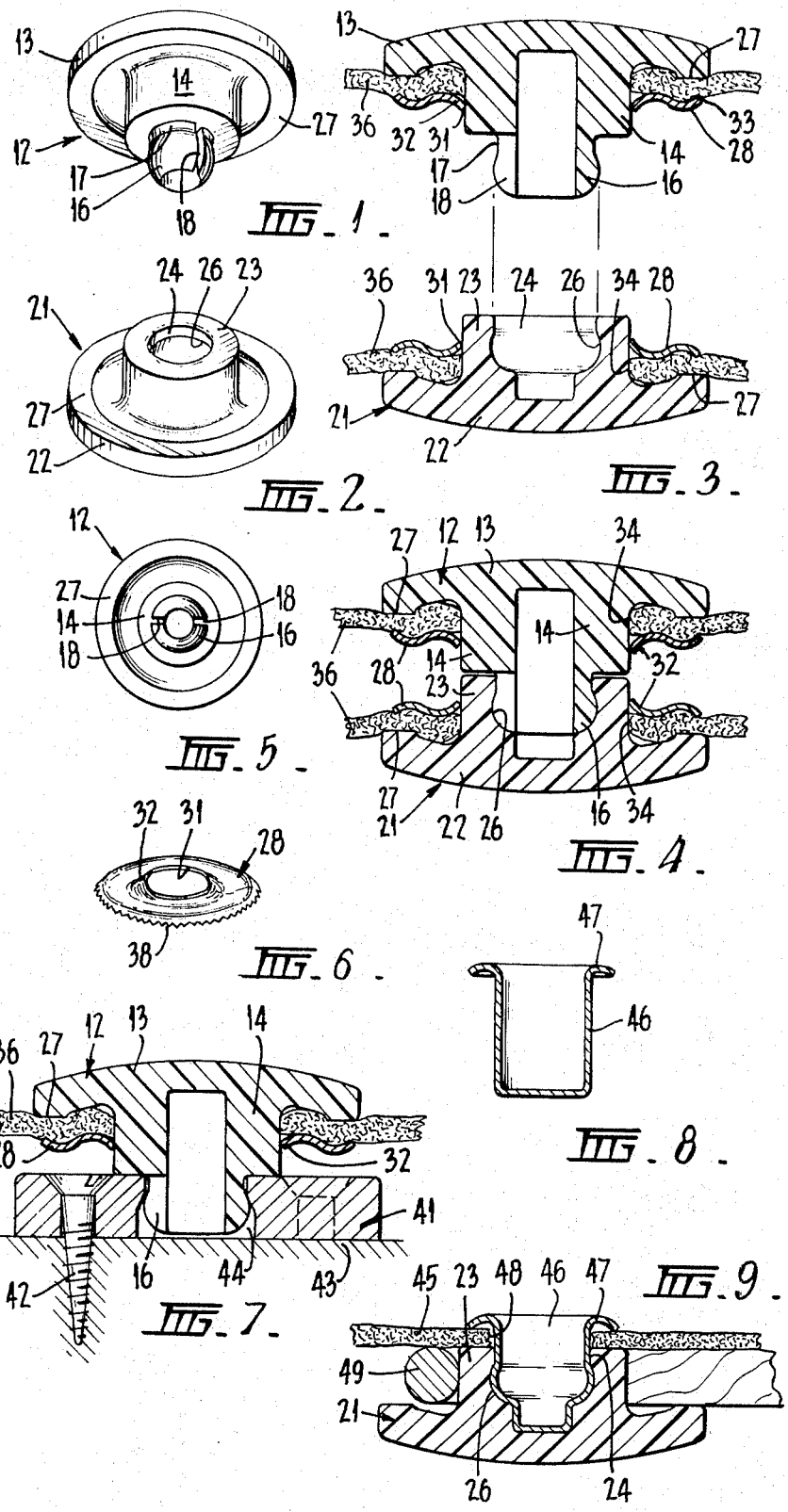

SNAP FASTENER

BACKGROUND OF THE INVENTION

This invention relates to snap fasteners of the type generally, but not exclusively, used for clothing or attaching or fastening cloth or webbing type materials.

Prior known snap fasteners in metal or plastic comprise riveted fastener pieces with a captive wire ring in the metal fastener to provide the snap action. In the known plastic fasteners the material characteristics provide the snap action.

These known fasteners have a number of disadvantages. The captive ring in the metal fastener is prone to jamming or freezing due to the ingress of foreign material, corrosion or physical conditions. The unfastening of the known fasteners tends to pull the riveted assembly of the two pieces apart so that a poor riveting action may result in a failed fastener, and failure through separation of the two riveted fastener pieces retaining the material means loss of joining or fastening action. The known fasteners, particularly those of plastic material have an inherent weakness due to the small size of the stem joining the two pieces of each fastener, and failure of this stem leads to failure of the fastener. Increasing the size of the stem leads to a larger and more bulky fastener. As previously stated, the unfastening action of the known fasteners tends to pull the assembly of the riveted pieces apart and thus the gripping action of the two pieces has to be sufficient to retain the material at all times, even under these pull-apart forces.

The known fasteners are relatively inflexible to material thickness changes and the riveting results in excessive bulk with thin materials and poor strength with thick materials. Disassembly of either of the two riveted parts would normally result in part destruction requiring replacement. Also assembly of the known fastener parts requires special tools or a machine to properly form the rivet and give the correct clamping force, and this also results in longer assembly times.

It is an object of the present invention to provide a snap fastener which overcomes the above-stated disadvantages of the prior art and confers numerous advantages over the known fasteners.

It is a further object of the invention to provide a snap fastener which is easy to fasten and unfasten and yet which firmly secures cloth, webbing or other material together.

According to one aspect of the invention there is provided a snap fastener comprising a first part formed of synthetic plastic material and having a head portion, a shank extending normally from the head portion, said shank being hollow and having a shape to enable distortion thereof on snap engagement with a second part, and a washer mounted on said shank, said washer having an inner edge portion bent out of the plane of the washer and directed away from the head portion, said inner edge portion being engaged with the shank to resist forces tending to move the washer along the shank away from the head.

According to a further feature of the invention the said second part may comprise a part having a head and a hollow shank extending normally thereto, said hollow shank being shaped so as to receive the shank of said first mentioned part in snap action engagement and provide a two-part fastener.

In order that the invention may be more readily understood, sveral embodiments thereof will now be described with reference to the accompanying drawings, wherein:

FIG. 1 is a perspective view of a male part of a snap fastener according to the invention.

FIG. 2 is a perspective view of a female part of a snap fastener according to the invention.

FIG. 3 is a cross-sectional view showing both parts, assembled with fabric material and clamping washer, about to be interengaged.

FIG. 4 is a view similar to FIG. 3, but shows the parts interengaged.

FIG. 5 is an underneath view of a modified form of male part.

FIG. 6 is a perspective view of a second form of clamping washer.

FIG. 7 is a view similar to FIG. 4, but shows a modified form of female part.

FIG. 8 is a cross-section of a blind eyelet for use in a further modification of the invention, and FIG. 9 is a cross-sectional view showing the interengagement of the eyelet of FIG. 8 in a female part.

Referring to FIGS. 1 to 4 of the drawings, the fastener comprises a male part 12 having a disc-shaped head 13 and an integral shank 14 extending normally of the head. The shank 14 is hollow and is formed at its outer end in a hollow bulbous part 16. An undercut portion 17 is formed between the bulbous part 16 and the shank 14. A longitudinally extending slot 18 is provided in the bulbous part 16 to facilitate deformation thereof.

The female part 21 is of a configuration similar to that of the male part 12, being formed with a disc-like head 22 and an integral shank 23. The shank 23 is provided with a bore 24 which is undercut at 26 below the outer end of the shank 23, to accommodate the bulbous part 16 of the male part 12.

The dimensions of the heads 13 and 22 and the shanks 14 and 23 are substantially identical, both heads 13, 22 being dished or concave as shown in FIG. 3. A rim portion 27 projects axially from each head 13 and 22, in the same direction as the shank, and provides a seat for the outer edge 33 of a clamping washer 28.

The washers 28 are each formed with the bore 31 defined by an upwardly turned inner edge portion 32. The outer edge 33 of the washer 28 is turned out of the plane of the washer 28 in the opposite direction to the inner edge 32, as shown in FIGS. 3 and 4. The diameter of the bore 31 is made slightly less than the diameters of the shanks 14 and 23, such that the washer 28 has an interference fit on the shanks.

The fastener parts are assembled so that the shanks 14 and 23 pass through pre-formed holes 34 in fabric material 36. A washer 28 is engaged over each shank 14 and 23 with the inner edge portion 32 turned away from the head end of the shank. The washer 28 is forced down on the material and clamps it between the head and the washer. The washer outer edge 33 securely clamps material to the rim portion 27 while radially inner section of the washer 28 clamps the material to the dished surface of the head. The inner edge portion 32 of the washer 28 bites into the surface of the shank and thereby resists forces tending to move the washer 28 along the shank away from the head.

The male and female parts 12 and 21 are interengaged by a snap action engagement. During the engagement the bulbous part 16 is deformed as it enters the undercut bore 24.

Deformation of the bulbous part 16 is considerably easier with the provision of two longitudinal slots 18, as shown in the embodiment illustrated in FIG. 5. The slots 18 are diametically opposite each other and extend the length of the bulbous part 16. With this construction, the fastener more readily snaps into engagement with a female part 21 and disengagement of the parts is also facilitated.

While the constructions described above are extremely successful for most fabric material, some special fabrics must be more securely held than is possible with the clamping action of the washer 28. For these special materials, such as those with very low coefficients of friction, the outer edge portion 38 of the washer 28 is serrated as illustrated in FIG. 6. The serrated edge 38 grips the fabric material 36 as well as clamping the material between the washer 28 and the head of a fastener part.

Referring to FIG. 7 of the drawing the fastener comprises a male part 12 similar to that described above and having a washer 28 engaged on the shank 14 clamping material 36 to the head 13.

The fastener is interengaged in a female part 41 which is secured, as by screw 42, to a support 43 so that the material 36 is removably attached to the support 43. The female part 41 is provided with an undercut bore 44 to receive the bulbous part 16. The thickness of the female part 41 is greater than the length of the bulbous part 16.

The material 36 may be fabric, canvas, rubber or synthetic plastic sheet or the like. The female part 41 may be of metal or a plastic molding attached to, for example, a vehicle to provide means for removably attaching a canopy, tarpaulin or the like thereto.

In a further embodiment of the invention illustrated in FIGS. 8 and 9, a female part, substantially identical to that described above with reference to FIGS. 1 to 4, is mounted on relatively rigid material 45 by means of a blind eyelet 46. The eyelet 46, shown in FIG. 8, is elongated or cup-shaped with the upper end thereof outwardly turned to form a flange 47.

The eyelet 46 inserted through a pre-formed hole 48 in the material 45 and is engaged in the undercut bore 24 of the pa8t 21. A clamping or crimping force is applied to the eyelet 46 and the female part 21 to cause the eyelet 46 to deform and assume the internal shape of the undercut bore 24. The flange 47 of the eyelet 46 securely engages with one side of the material 45 while the end of the shank 23 engages with the other side of the material.

With this arrangement, the female part 21 stands out from one side of the material 45 to form an upstanding button or the like. The material may be leather, artificial leather, relatively rigid synthetic plastic or the like, such as used for the manufacture of boots and shoes, coats and other items of wearing apparel. The female part 21 may then be used as a button, e.g., a boot button in place of lace hooks in ladies boots. The lace 49 engages around the shank 23 of the part 21 and the head 22 prevents the lace 49 from being accidentally displaced from the button.

The fasteners of the present invention may be injection molded from synthetic plastic material such as acetal, polypropylene, polysulfone or the like. They may be made in any desired color and of any suitable shape to provide an attractive appearance on articles of clothing. For example the head of the fastener may be oval, polygonal, fluted or circular, as shown.

The washer may be of any suitable material with the required characteristics to withstand the interference or force fit on the shank of the fastener. It is preferably of a corrosion resistant metal such as brass. The washer may also have inwardly projecting protrusions or tops to ensure a firm grip on the shank of the fastener. Manufacturing tolerances may be allowed for by forming the shank with a small taper along its length.

It will be appreciated that the fastener of the present invention in its various forms confers many advantages over the prior art in that it does not use a captive ring, the snap action is contained within the material thickness rather than outside or between the material, and this gives the benefit of a more compact design with far less protrusion and bulk to discomfit or snag. It also brings the material to be fastened closer, providing a far better sealing action. Another feature of the present invention is the constant retention over the full range of material thicknesses. The fastener of the invention may be disassembled and reused as necessary. Only simple tools are required to assemble the washers on the shanks.

We claim:

1. A snap fastener comprising a first part molded in one piece of synthetic plastic material and comprising a head portion, a shank extending normally from the head portion, and a hollow bulbous portion extending axially from the free end of the shank, said shank having a substantially cylindrical outer surface terminating at an annular end surface defining a shoulder between the shank and the bulbous portion, with the diameter of the cylindrical shank being greater than the maximum diametrical dimension of the bulbous portion, the bulbous portion being sized for snap engagement within an undercut bore of a second part, and a washer mounted on the cylindrical shank, said washer having an inner edge portion bent out of the plane of the washer and directed away from the head portion, said inner edge portion being frictionally engaged with the cylindrical shank to resist forces tending to move the washer along the shank away from the head.

2. A snap fastener as defined in claim 1, wherein said second part comprises a head portion, a shank extending normally from the head, said shank having the undercut bore therein to receive the bulbous portion of the shank of the first part in snap engagement, and a washer on the shank of the second part, said washer being formed with an outwardly turned inner edge portion to engage with the shank.

3. A snap fastener as defined in claim 2, wherein each washer has an inwardly turned outer edge portion, and the heads of each part are each provided with a rim projecting therefrom in the direction of the shank, and material is clamped between the heads and the washers with the inwardly turned outer edge portion of each washer clamping material on said rims.

4. A snap fastener as defined in claim 2, wherein the head portion of each part is dished in the direction of the shank.

5. A snap fastener as defined in claim 1, wherein said bulbous portion has at least one longitudinal slot or channel in the wall thereof, the slot or channel facilitating resilient deformation of the bulbous portion for snap engagement with the second part.

6. A snap fastener as defined in claim 1, wherein the second part comprises a member secured to a support, and an undercut bore means to receive the bulbous portion of said first part.

* * * * *